May 29, 1956 W. L. HARTOP, JR., ET AL 2,747,756
RUBBER CLOSURE
Filed July 10, 1952
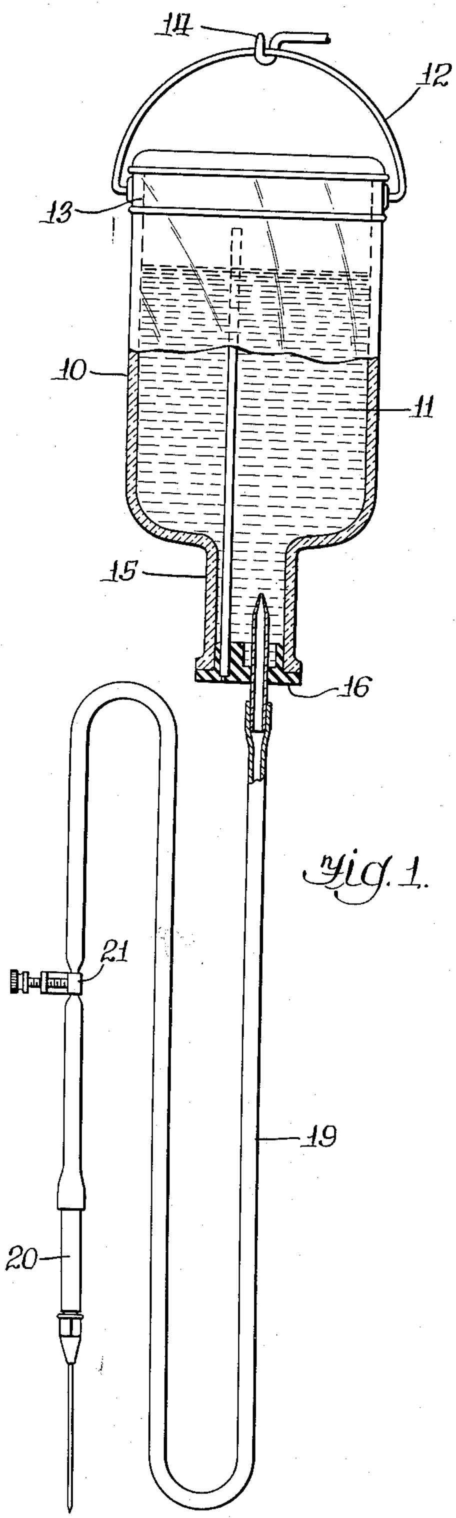
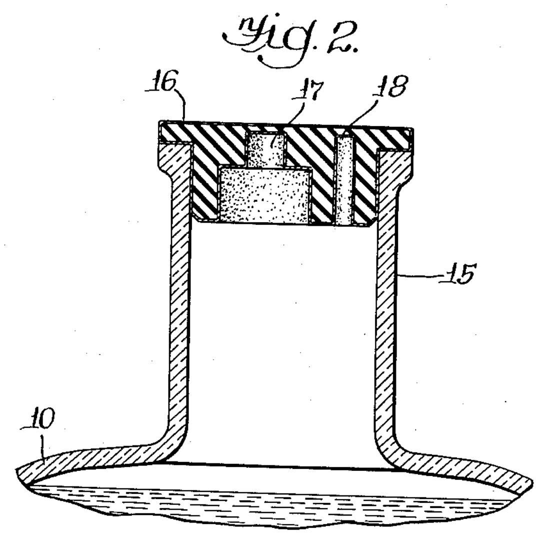
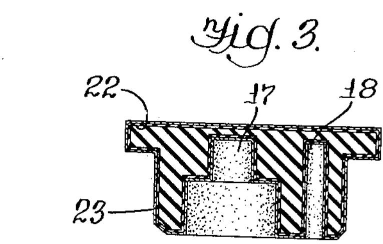
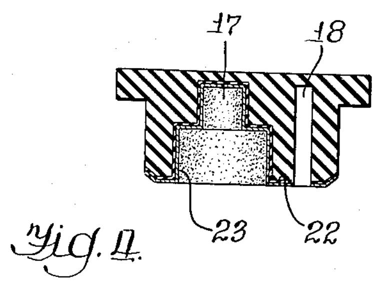
INVENTORS.
William L. Hartop, Jr.
Edward J. Morrisey, Jr.
By John H. Schneider
Atty.

United States Patent Office 2,747,756

Patented May 29, 1956

2,747,756

RUBBER CLOSURE

William L. Hartop, Jr., and Edward J. Morrisey, Jr., Waukegan Township, Lake County, Ill., assignors to Abbott Laboratories, North Chicago, Ill., a corporation of Illinois Application July 10, 1952, Serial No. 298,046

7 Claims. (Cl. 215—47)

This invention relates to closures for containers and more particularly to closures used in connection with medicinals or pharmaceutical containers such as medicinal vials, ampoules, containers for administering parenteral solutions and the like and to a method of preparing said closures.

Containers of the above type generally have as closure members a resilient natural rubber stopper. It is essential to form a perfectly impervious seal to prevent deterioration and contamination of the contents of the containers, particularly where the container is partially evacuated. Frequently, however, ingredients of the stopper, such as curing accelerators, antioxidants and the like, are extractable from the stopper and contaminate the solution. It is also possible to have particles of a coating on the stopper to separate from the stopper and enter the solution and further contaminate the contents of the container. This has been particularly true of coated rubber stoppers containing natural rubber, since it has been impossible to provide these stoppers with a firmly adhering coating of resin such as nylon, without employing a special pre-coating with adhesives or the like which renders the process commercially impractical.

It is thus an object of the invention to provide a closure member for a medicinal container which will permit prolonged contact between the fluid contents and the closure member without causing contamination of the contents of the container.

It is a further object of the invention to provide a closure member for a medicinal container which has improved resistance to chemical solutions for prolonged periods.

Another object of the invention is to provide a stopper coating which retains its inherent flexibility for a prolonged period in contact with pharmaceutical solutions even after prolonged storage at elevated temperatures.

Still another object of the invention is to provide a closure member which has a firmly adherent protective coating thereon which does not become detached even after prolonged storage under adverse conditions.

A further object of the invention is to provide a method of treating natural rubber stoppers which permits the application of a firmly adhering protective coating thereto.

Other objects of the invention will be apparent from the detailed description and claims to follow, taken in conjunction with the accompanying drawings.

In accordance with the present invention a rubber closure member is provided with a remarkedly adherent outer protective coating which has unusual toughness and flexibility combined with excellent resistance to chemical action. Heretofore rubber closure members have been coated with various compositions and treated in various manners to modify the surface thereof, but none of these treatments have produced a coating or modified surface which permanently adheres to the natural rubber surface without cracking or becoming detached and contaminating the solutions within the container. By following the teaching of the present invention it is possible to provide a natural rubber stopper with a resinous coating which is exceptionally adherent and which will not blister or become detached from the surface of the rubber even after prolonged periods of storage in contact with medicated solution within the container at elevated temperatures.

In the drawings:

Figure 1 is an elevation view of a container with a closure member of the present invention partially in section.

Figure 2 is an enlarged vertical sectional view showing the closure member in position within the container.

Figure 3 is an enlarged vertical sectional view of a closure member showing the detailed structure thereof.

Figure 4 is an enlarged vertical sectional view of a modified form of the closure member.

In Figure 1 of the drawings by way of illustrating one embodiment of the invention there is shown a glass receptacle 10 containing a medicated solution 11 to be administered by injection to a patient. The end of the receptacle 10 remote from the discharge outlet is provided with a metal bail 12 which has pivotally connected thereto a wire band 13 by which the receptacle 10 is suspended in an inverted position as on a hook 14. The receptacle 10 is provided with a neck or discharge outlet 15 which is closed by a rubber stopper 16 for hermetically sealing the contents within the container 10. The rubber stopper 16 is provided with recesses 17 and 18 which provide diaphragms of reduced thickness and an opening for receiving a length of glass tubing which facilitates the discharge of the medicated solutions therefrom through a length of flexible tubing 19 which has a hypodermic needle assembly 20 at the outer end thereof, the rate of flow of solution therethrough being adjusted by means of pinch clamp 21.

The rubber stopper 16 has the surface thereof modified so as to provide a surface film 22 thereon comprising molecules of modified rubber which have been reacted with an acid or halogenated by means of gaseous halogen or a halogen producing compound. Superimposed on film 22 is an outer resinous firmly adhering coating 23, of synthetic polyamides of the nylon type.

The polyamides of the above type are prepared in accordance with the teaching of U. S. Patent No. 2,430,860 and wherein preferably about 30 to 35% of the amide groups are converted to n-methoxymethylamide groups, the percentage of amide groups substituted being controlled as taught in column 4, lines 31-65 of the above patent. Soluble nylon resins of the above type which have been found to be very satisfactory for use in coating rubber stoppers in the manner described herein are sold commercially as "Type 8 Soluble Nylon Resins, DV 45 and DV 55" by the E. I. du Pont de Nemours & Co. (Inc.), Wilmington, Delaware.

In order to provide a firmly adherent coating of soluble nylon resin which after curing will firmly adhere to natural rubber surfaces without blistering, flaking, or the like, during autoclaving and subsequent storage it is necessary to alter the surface of the rubber to be coated. This is accomplished most readily by subjecting the article or the particular part thereof to be coated to a brief treatment with an acidic agent or a halogen or a halogen producing substance. Thus, in contrast with the practice of forming a relatively thick impervious layer of oxidized or chlorinated rubber on the surface of the article in order to provide an impervious coating thereon, it has been found that only the outer molecular surface of the rubber should be modified in order to provide the most satisfactory surface upon which to apply an outer layer of soluble nylon resin. In this manner the rubber surface retains its natural flexibility and is particularly suitable for retaining a firmly adhering film of soluble nylon resin.

In order to further illustrate the present invention the following specific examples are given, but it should be understood that the invention is not limited to the specific details described therein.

*Example I*

Rubber stoppers for use in 500 cc. glass blood collecting containers having a durometer of about 55 (Shore A) and comprised of a natural rubber base were washed by immersing in distilled water and autoclaved for one half hour at a steam pressure of 15 lbs. per sq. in. Upon removal from the autoclave the stoppers were agitated with a hot detergent solution, rinsed with hot water and thoroughly dried. The washed stoppers were then subjected to treatment with dry chlorine gas for a period of about four minutes in order to modify the outer molecular surface of the rubber stoppers. The stoppers were then rinsed in water and immersed in a dilute ammonia solution for five minutes to remove all traces of chlorine. All traces of ammonia were removed by tumbling in hot water and the stoppers then thoroughly dried.

The stoppers pre-treated in the foregoing manner were subsequently dipped to the desired depth in a soluble nylon coating prepared in the following manner:

Citric acid, U. S. P., (0.75 g.) was dissolved in 16 cc. of water and this solution added to 84 cc. of 95% ethyl alcohol. To this solution was added 15 g. of Type 8 Soluble Nylon Resin, DV 55, and the mixture heated to a temperature of about 55° C. with stirring until a homogeneous solution was obtained.

The stoppers coated in the above manner were allowed to dry thereupon the coated stoppers were cured by holding at a temperature of about 120° C. for a period of thirty minutes. At the end of the curing period the stoppers were removed from the oven and allowed to stand for about 18 hours before being used.

In the above coating composition the "Type 8 Soluble Nylon Resin, DV 55" indicates a soluble nylon resin of the type disclosed in U. S. Patent No. 2,430,860 made in accordance with Example I wherein 35% of the amide groups are subsittuted.

Rubber stoppers treated in the above manner had a tough, firmly adhering coating with a very smooth glossy appearance.

*Example II*

A pre-treatment and coating process substantially as disclosed in Example I wherein the stoppers were subjected to treatment with vapors of sulfuryl chloride for about five minutes to produce a surface modification equivalent to the treatment with chlorine gas for a period of about four minutes. The foregoing treatment permitted the stopper to be coated with a tough firmly adhering surface coating of soluble nylon resin as described in Example I.

*Example III*

A pre-treatment and coating procedure substantially as described in Example I wherein the stoppers were treated with gaseous thionyl chloride for a period of about one minute in place of the treatment with the chlorine gas as in Example I. The foregoing treatment permitted the stopper to be coated with a tough firmly adhering surface coating of soluble nylon resin as described in Example I.

*Example IV*

A pre-treatment and coating procedure substantially as described in Example I wherein the stoppers were immersed in a saturated solution of chlorine in water and agitated for a period of between 15 and 60 seconds and preferably for 30 seconds, after which the stoppers were rinsed and treated with dilute ammonia as described in Example I. The stoppers so treated possessed a firmly adhering coating of soluble nylon resin.

*Example V*

A pre-treatment and coating procedure substantially as described in Example I wherein the stoppers were treated with concentrated hydrochloric acid (37%) for a period of about two minutes after which they were washed and treated in accordance with the procedure outlined in Example I. Stoppers so treated produced a firmly adherent coating of nylon resin.

*Example VI*

A pre-treatment and coating procedure substantially as described in Example I wherein closure members were treated with a dilute solution of sodium hypochlorite (4%) for a period of about ten minutes and thereafter rinsing and treating the closure members according to the procedure outlined in Example I. The foregoing provided a firmly adhering coating of modified nylon resin on the closure members.

Other halogen containing compositions, such as the halogen containing acids, which are effectively used in the above manner are hydrochloric, hydrobromic and hydroiodic acids; hypochlorous, hypobromous, hypoiodous acids; and perchloric acid.

In preparing the soluble nylon resin solution for application to the pre-treated stoppers it is essential to include in the solution citric acid or an equivalent similar organic acid which acts as a catalyst to promote cross-linking, such as maleic acid or the like, in order to convert the soluble nylon resin to the insoluble form during the curing process. When the citric acid concentration is relatively low, as for example less than about 2% based on the weight of the resin, the coating is definitely inferior since it exhibits poor adhesion and blistering, particularly after prolonged heating in an autoclave in accordance with government specifications. With high concentrations of citric acid the coating is noticeably less resilient. It is preferred to employ about 5% citric acid although concentrations between 3 and 7% citric acid give very satisfactory results.

Variations can also be made in the concentration of nylon resin in the solvent. While it is preferred to employ a solution having 15 g. of the soluble nylon resin dissolved in 100 cc. of 80% ethyl alcohol, satisfactory results are obtained when 10 g. of the resin are dissolved in 100 cc. of 90% ethyl alcohol, 20 g. of the resin dissolved in 100 cc. of 80% ethyl alcohol or 30 g. resin in 100 cc. of 70% ethyl alcohol. Thus, considerable variation can be made in the concentration of nylon resin in the solution and in the composition of the solvent for the solution but care must be taken to maintain the concentration of resin in solution sufficiently high to provide an adequately tough coating which has the desired glossy appearance and resistance to autoclaving. When the resin concentration is reduced to about 5% of the solution the resulting coating is very thin. While it is possible to provide a satisfactory coating with the 5% resin solution by applying several individual coatings in order to build up an adequately thick coating, it is preferred for economical reasons to apply the resin coating in a single application.

In preparing a coating solution of modified nylon resin, other organic polar solvents, such as phenols and the low molecular weight alcohols, have also been used with satisfactory results. Thus, methyl alcohol, propyl alcohol, isopropyl alcohol and butyl alcohol can be used in addition to ethyl alcohol. The limiting factors with regards to the solvent used is its solubility in water and the solubility of the resin in the solution formed. In preparing a given resin solution a solvent, such as the phenols or low molecular weight alcohol, can be used provided it is soluble in the volume of water present and provided the nylon resin is soluble in the resulting solution.

In the above examples the modified nylon coating has been applied by dipping the pre-conditioned stopper in the nylon solution. It should be understood, however, that the coating may be applied in other ways, as by spraying, brushing, wiping, tumbling or the like. Likewise other soluble nylon resins are also suitable for coating rubber stoppers, such as the "Type 8 Soluble Nylon Resin, DV 45" wherein about 30% of the amide groups are substituted as described in U. S. Patent No. 2,430,860. The present invention thus should not be limited to the precise soluble nylon resin disclosed in the examples, as those skilled in the art can readily select other soluble nylon resins which are equally useful in accordance with the present teachings.

In order to evaluate the modified nylon coatings the coated stoppers are subjected to several laboratory tests. The usual preliminary test comprises heating the stoppers immersed in distilled water in an autoclave for a period of eight hours at a temperature of 121° C. under a steam pressure of 15 lbs. per sq. in. As all coated stoppers must pass such a test in order to meet government specifications, any coating which does not pass this initial autoclaving test is considered unsatisfactory.

The stoppers are also subjected to an accelerated aging test which comprises placing the stoppers in an oven maintained at a temperature of 70° C. for a period of 48 hours during which a slow stream of air is passed through the oven. At the end of this heating period the stoppers are allowed to stand at room temperature for about 12 hours and then subjected to the above described 8 hour autoclaving test. The foregoing procedure is equivalent to many months of natural aging, and many coatings which pass the above autoclave test fail to pass the latter accelerated aging test.

In order to evaluate the ability of the stoppers to resist the chemical action of solutions to which they are normally subjected during prolonged storage, the stoppers are inserted in a vacuum blood collecting bottle containing, for example, 500 cc. of a 3½% solution of polyvinylpyrrolidone in 0.9% sodium chloride. The bottles are evacuated and then autoclaved both upright and inverted for a period of eight hours at a steam pressure of 15 lbs. per sq. in. (121° C.). The foregoing autoclave test on evacuated containers in which a medicated solution is in contact with the coated stopper closely simulates actual use conditions and provides a very realistic test for the coated stoppers. It has been found, that the nylon coating of the applicants' stoppers when subjected to the foregoing test does not blister or otherwise separate from the rubber stopper, nor is there evidence of attack on the coating or any change in the glossy appearance of the stopper. Similar results are observed when the stoppers are subjected to autoclaving in the above manner in contact with USP ACD solution, and 4% sodium citrate in water.

In the drawings accompanying the description it should be understood that the enlarged views showing the coatings are by no means drawn to scale, since the molecular film of modified rubber is extremely thin and the outer coating of modified nylon is many times thicker than the inner film.

Others may readily adapt the invention for use under various conditions of service, by employing one or more of the novel features disclosed or equivalents thereof. As at present advised with respect to the apparent scope of our invention, we desire to claim the following subject matter.

We claim:

1. A method of coating a closure member for a pharmaceutical container with a firmly adherent protective film which comprises subjecting the surface of a closure member to be coated to contact with a halogen-containing acid for a period sufficient to modify only the surface molecules of the member and thereafter applying to at least the portion of the modified surface to be coated a solution having as the film-forming ingredient thereof a linear synthetic methyl polycarbonamide having a minor proportion of the amide groups thereof substituted with alkoxy groups in an aqueous organic polar solvent containing a small amount of an acid catalyst which promotes cross-linking of the polycarbonamide, and heating the coated closure member to promote cross-linking of the polycarbonamide, whereby the said coating is converted from a soluble to an insoluble form.

2. A method of coating a closure member for a pharmaceutical container with a firmly adherent protective film which comprises subjecting the surface of a closure member to be coated to contact with a halogen-containing acid for a period sufficient to modify only the surface molecules of the member and thereafter applying to at least the portion of the modified surface to be coated a solution having as the film-forming ingredient thereof a linear synthetic methyl polyhexamethylene adipamide having between about 30 and 35% of the amide groups thereof substituted with alkoxy groups in an aqueous organic polar solvent containing a small amount of an acid catalyst which promotes cross-linking of the polyhexamethylene adipamide and heating the coated closure member to promote cross-linking of the polyhexamethylene adipamide whereby the said coating is converted from a soluble to an insoluble form.

3. A method of coating a closure member for a pharmaceutical container with a firmly adherent protective film which comprises subjecting a penetrable container stopper comprised essentially of rubber to contact with a halogen containing acid until only the surface molecules thereof are halogenated, thereafter applying to the modified surface a solution having as the film-forming ingredient thereof a linear synthetic methyl polyhexamethylene adipamide having between about 30 and 35% of the amide groups thereof substituted with methoxy groups in an aqueous solution of a low molecular weight alcohol containing a small amount of an acid catalyst which promotes cross-linking of the polyhexamethylene adipamide, and heating the coated stopper to promote cross-linking of the polyhexamethylene adipamide, whereby the coating is converted from a soluble to an insoluble form.

4. A method of coating a natural rubber surface with a firmly adhering insoluble protective film which comprises thoroughly washing a natural rubber surface by subjecting the said surface to autoclaving in water and agitating in a detergent solution followed by thoroughly rinsing with water, thereafter contacting the surface with a halogen-containing acid for a period sufficient to halogenate only the surface molecules and terminating the action of the said composition before an impervious film is formed thereon, applying to the said surface a solution having as the film-forming ingredient thereof a linear synthetic methyl polyhexamethylene adipamide having between about 30 and 35% of the amide groups substituted with methoxy groups in an aqueous solution of a low molecular weight alcohol and a small amount of citric acid as a curing catalyst, and heating the coated surface to cure the film of polyhexamethylene adipamide, whereby the coating is changed from a soluble to an insoluble form.

5. A closure member for a pharmaceutical container which comprises a container closure member comprised essentially of rubber and adapted to form a sealing engagement with the said container and having on the surface adapted to be in direct communication with the interior of the said container an insoluble firmly adherent coating of a polymerized linear synthetic methyl polycarbonamide having a minor proportion of the amide groups thereof substituted with alkoxy groups.

6. A closure member as defined in claim 5 wherein the linear synthetic polycarbonamide is a methyl polyhexamethylene adipamide having between about 30 and 35% of the amide groups thereof substituted with alkoxy groups.

7. A closure member as described in claim 5 wherein the linear synthetic polycarbonamide is a methyl polyhexamethylene adipamide having between about 30 and 35% of the amide groups thereof substituted with methoxy groups.

References Cited in the file of this patent

UNITED STATES PATENTS

| | | |
|---|---|---|
| 1,810,560 | Garvey | June 16, 1931 |
| 2,191,495 | Nesset | Feb. 27, 1940 |
| 2,302,557 | Langkammerer | Nov. 17, 1942 |
| 2,322,779 | Gocher et al. | June 29, 1943 |
| 2,438,149 | Cutter et al. | Mar. 23, 1948 |
| 2,573,637 | Bender | Oct. 30, 1951 |
| 2,629,379 | Fields | Feb. 24, 1953 |
| 2,649,090 | Parsons et al. | Aug. 18, 1953 |